US008224570B2

(12) United States Patent
Sumizawa et al.

(10) Patent No.: US 8,224,570 B2
(45) Date of Patent: Jul. 17, 2012

(54) ON-VEHICLE MAP DISPLAY APPARATUS, MAP DISPLAY METHOD

(75) Inventors: Akio Sumizawa, Sagamihara (JP); Akihiro Kaneko, Suginami-ku (JP); Shigeru Shimada, Kodaira (JP); Kishiko Maruyama, Kokubunji (JP); Akinori Asahara, Kokubunji (JP)

(73) Assignee: Xanavi Informatics Corporation, Zama-shi (JP)

( * ) Notice: Subject to any disclaimer, the term of this patent is extended or adjusted under 35 U.S.C. 154(b) by 936 days.

(21) Appl. No.: 12/105,720

(22) Filed: Apr. 18, 2008

(65) Prior Publication Data

US 2008/0275631 A1    Nov. 6, 2008

(30) Foreign Application Priority Data

Apr. 19, 2007   (JP) .................................. 2007-110102

(51) Int. Cl.
*G01C 21/00* (2006.01)
*G01C 21/34* (2006.01)
*G08G 1/123* (2006.01)

(52) U.S. Cl. ...................................................... 701/414
(58) Field of Classification Search .................. 701/208, 701/212; 370/474; 340/995.13; 455/456.1
See application file for complete search history.

(56) References Cited

U.S. PATENT DOCUMENTS

| 5,925,091 | A  | * | 7/1999 | Ando ............................. 701/212 |
| 2005/0058155 | A1 | * | 3/2005 | Mikuriya et al. ............. 370/474 |
| 2005/0140524 | A1 | * | 6/2005 | Kato et al. ............... 340/995.13 |
| 2007/0155404 | A1 | * | 7/2007 | Yamane et al. ............ 455/456.1 |
| 2008/0195310 | A1 | * | 8/2008 | Yamada ........................ 701/208 |

FOREIGN PATENT DOCUMENTS

| JP | 10-283589 A | 10/1998 |
| JP | 2001-148026 A | 5/2001 |
| JP | 2003-194557 A | 7/2003 |
| JP | 2004-347333 A | 12/2004 |

OTHER PUBLICATIONS

Japanese Office Action dated Oct. 4, 2011 including English-language translation (Five (5) pages).

* cited by examiner

*Primary Examiner* — Gerald J. O'Connor
*Assistant Examiner* — John Pauls
(74) *Attorney, Agent, or Firm* — Crowell & Moring LLP

(57) ABSTRACT

This on-vehicle map display apparatus comprises a map scale setting unit that sets a map scale, a summary map generation unit that generates a summary map by abbreviating road shapes if a map scale that is less than a predetermined scale is set by the map scale setting unit, a summary map display control unit that displays the summary map generated by the summary map generation unit upon a display monitor, a congestion information acquisition unit that acquires congestion information, and a congestion information display control unit that displays the congestion information acquired by the congestion information acquisition unit as superimposed upon the summary map displayed upon the display monitor by the summary map display control unit.

10 Claims, 6 Drawing Sheets

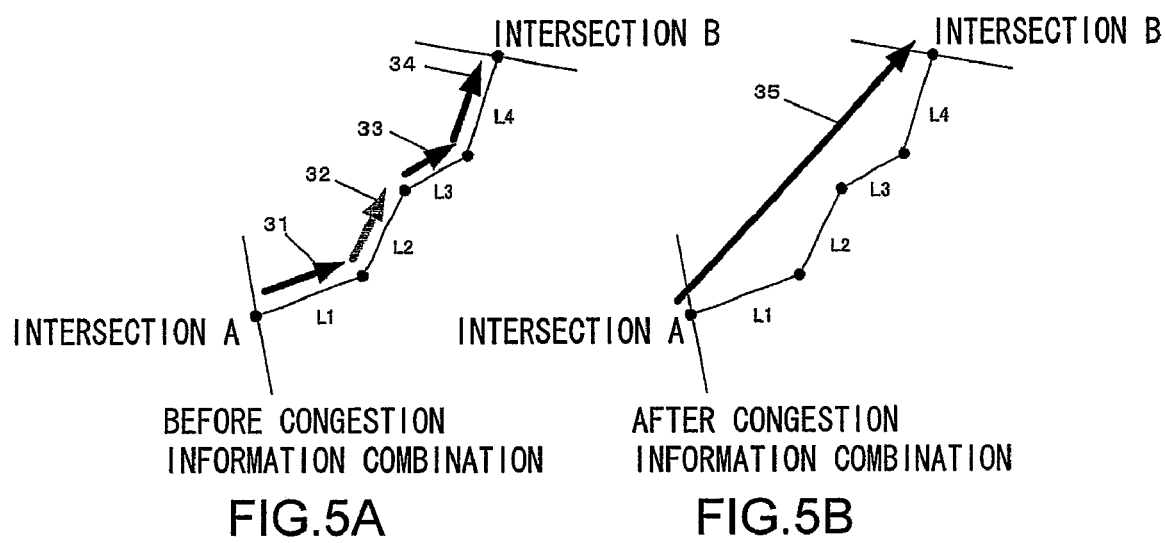
FIG.5A BEFORE CONGESTION INFORMATION COMBINATION
FIG.5B AFTER CONGESTION INFORMATION COMBINATION

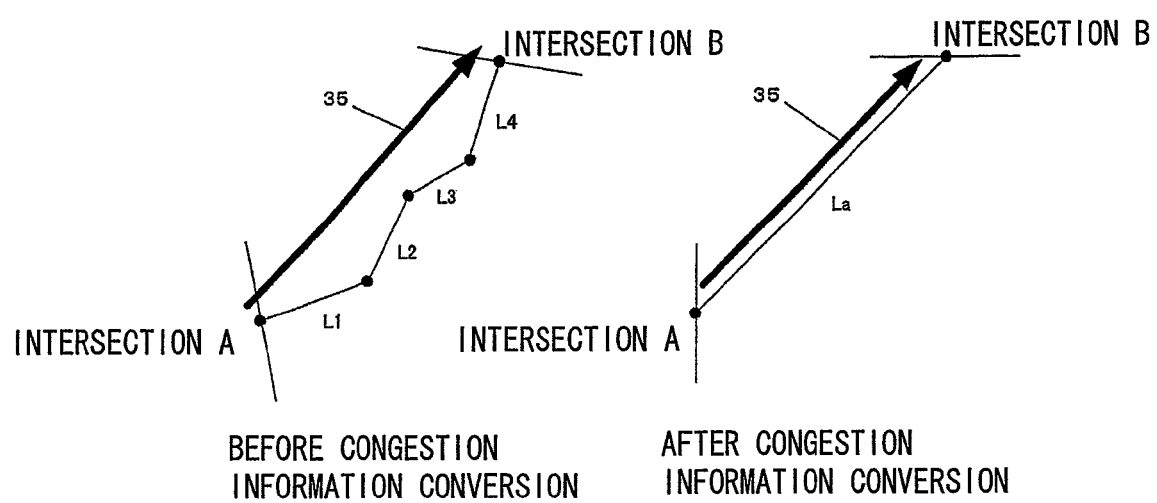
FIG.6A BEFORE CONGESTION INFORMATION CONVERSION
FIG.6B AFTER CONGESTION INFORMATION CONVERSION

ON-VEHICLE MAP DISPLAY APPARATUS, MAP DISPLAY METHOD

INCORPORATION BY REFERENCE

The contents of the disclosure of the following priority application are herein incorporated by reference:

Japanese Patent Application No. 2007-110102 (filed on Apr. 19, 2007).

BACKGROUND OF THE INVENTION

1. Field of the Invention

The present invention relates to a map display apparatus for a vehicle.

2. Description of Related Art

In the prior art, a navigation device is known that displays a map of the region around a vehicle, and that displays congestion information for various roads upon this map. With this type of navigation device there has been the problem that, if the scale of the map is small and the congestion information for each road is displayed upon the map just as it is, then, since the gaps displayed between the roads are narrow, the display becomes complicated and difficult to understand, that is undesirable. Thus, the navigation device described in Japanese Laid-Open Patent Publication No. H10-283589 has been proposed as a device that solves this type of problem. This navigation device calculates the respective level of congestion within each of mesh regions that are set in advance, and changes the hue and/or brightness of the map for each mesh region according to the level of congestion that has thus been calculated. By doing this it is made possible to ascertain simply and easily which regions are relatively congested and which regions are comparatively free, even if the scale of the map is small.

However, with the navigation device described above, although it is possible to display the congestion situation in the mesh units, it is not possible to display the congestion information for each road upon the map in an easily understandable manner.

SUMMARY OF THE INVENTION

The on-vehicle map display apparatus according to the present invention comprises a map scale setting unit that sets a map scale, a summary map generation unit that generates a summary map by abbreviating road shapes if a map scale that is less than a predetermined scale is set by the map scale setting unit, a summary map display control unit that displays the summary map generated by the summary map generation unit upon a display monitor, a congestion information acquisition unit that acquires congestion information, and a congestion information display control unit that displays the congestion information acquired by the congestion information acquisition unit as superimposed upon the summary map displayed upon the display monitor by the summary map display control unit.

BRIEF DESCRIPTION OF THE DRAWINGS

FIGS. 5A and 5B are figures for explanation of a way in which the congestion information may be combined; and FIGS. 6A and 6B are figures for explanation of a way in which the congestion information may be converted.

DETAILED DESCRIPTION OF THE PREFERRED EMBODIMENTS

An on-vehicle navigation device according to an embodiment of the present invention will now be explained. This navigation device displays a map at a scale that has been selected by the user, and displays congestion information for various roads upon this map. Moreover, if the scale of the map is set to less than a predetermined scale, then it displays a summary map in which the shapes of the roads are abbreviated, and displays the congestion information for the various roads as superimposed upon this summary map. By doing this, the congestion information for the various roads is displayed upon the map in an easily understood format, even if the scale of the map is small.

Figure 1:
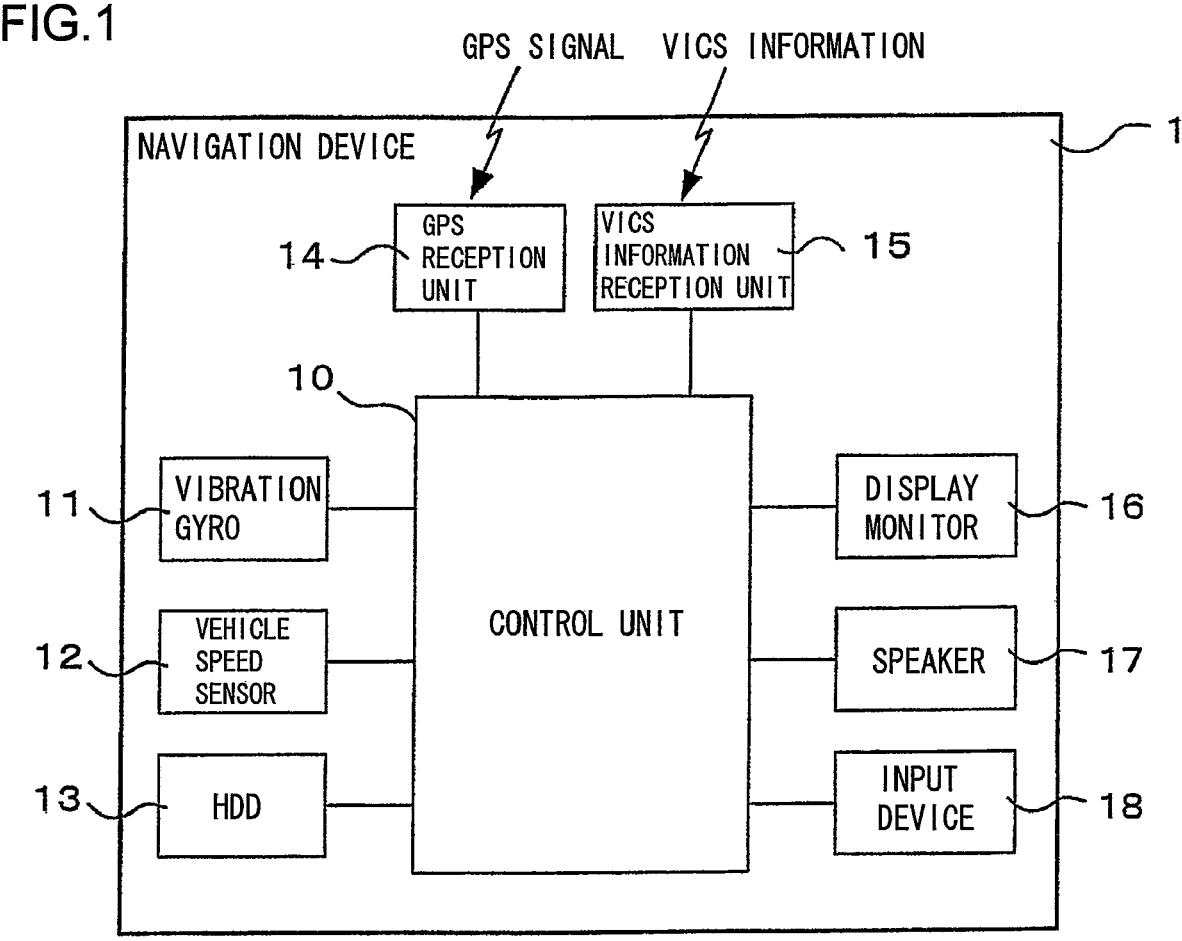
FIG. 1 is a block diagram showing the structure of a navigation device according to an embodiment of the present invention.

The structure of the navigation device of this embodiment is shown in the block diagram of FIG. 1. This navigation device 1 includes a control unit 10, a vibration gyro 11, a vehicle speed sensor 12, a hard disk (HDD) 13, a GPS reception unit 14, a VICS (Vehicle Information and Communication System) information reception unit 15, a display monitor 16, a speaker 17, and an input device 18.

The control unit 10 includes a micro processor and various types of peripheral circuitry and RAM and ROM and the like, and executes various types of processing based upon a control program and map data that are recorded upon the HDD 13. Due to this processing performed by the control unit 10, a summary map is displayed over which congestion information is superimposed, as previously described. The concrete details of the processing at this time will be explained subsequently in greater detail with reference to the flow chart of FIG. 4.

The vibration gyro 11 is a sensor for detecting the angular velocity of the subject vehicle. The vehicle speed sensor 12 is a sensor for detecting the speed of the subject vehicle. By using these sensors to detect the state of motion of the subject vehicle at predetermined time intervals, the amount of shifting of the position of the subject vehicle is obtained, and thereby the present position of the subject vehicle is detected.

The HDD 13 is a non-volatile recording medium, and various types of data is recorded thereupon, including map data. According to requirements, the data that is recorded upon the HDD 13 is read out by the control unit 10, and is utilized in various types of processing and control executed by the control unit 10.

It should be understood that path calculation data, path guidance data, road data, and background data are included in the map data that is recorded upon the HDD 13. The path calculation data is used for searching for a route to a destination. The path guidance data is used for guiding the subject vehicle to a destination according to a path that has been set, and specifies names of intersections and of roads and the like. The road data specifies the shapes and classes of roads. The background data specifies map shapes other than roads, and the positions of various types of facilities and the like. It should be understood that the minimum unit in the map data for specifying the roads is termed a link. In other words, each of the roads in the map data is built up from a plurality of links.

The GPS reception unit 14 receives GPS signals transmitted from the GPS satellites and outputs them to the control unit 10. In each GPS signal, as information for obtaining the position of the subject vehicle and the present time instant, there are included the position of the GPS satellite that transmitted that GPS signal and the time instant of its transmission. Accordingly, by receiving GPS signals from at least a predetermined number of the GPS satellites, it is possible to calculate the current position of the subject vehicle and the present time instant based upon the information therein.

The VICS information reception unit 15 receives VICS information that is transmitted from a VICS center to the navigation device 1. By the VICS information reception unit 15 receiving this VICS information, various types of road traffic information, including in particular congestion information, is acquired by the navigation device 1. The VICS information that has been thus received by the VICS information reception unit 15 is outputted to the control unit 10, and, along with being utilized by the control unit 10 when searching for a recommended path, also the contents thereof is displayed upon the display monitor 16.

It should be understood that this transmission of the VICS information from the VICS center to the navigation device 1 may be performed by a radio beacon of a type that is principally installed upon expressways, by an optical beacon of a type that is principally installed upon general roads, or by an FM multiplex broadcast. A radiowave beacon or an optical beacon is a device that transmits VICS information locally via radio waves or optical (infrared) radiation to vehicles that pass the vicinity of the location at which the beacon is installed. By contrast, with an FM multiplex broadcast, VICS information may be transmitted over a comparatively broad region.

The display monitor 16 is a device for displaying various types of pictures and images, and a liquid crystal display or the like may be employed. A map or the like of the region around the position of the subject vehicle is displayed upon this display monitor 16. It should be understood that the display monitor 16 is installed in a position in which it can be easily seen from the driver's seat, such as, for example, upon the dashboard or the instrument panel or the like of the subject vehicle. And the speaker 17 outputs audio for path guidance or the like, under the control of the control unit 10.

The input device 18 is a device for the user to perform various types of input actuation in order to operate the navigation device 1, and includes various types of input switches. By actuating this input device 18, the user is able, for example, to input the name or the like of an establishment or a ground point that he wishes to set as the destination, to select a destination from a list of places that are registered in advance, or to scroll the map in any desired direction. This input device 18 may be implemented as an actuation panel or a remote control or the like. Or, it would also be acceptable to arrange for this input device 18 to be a touch panel that is integrated with the display monitor 16.

When the user actuates the input device 18 and sets a destination, then, taking the current position of the subject vehicle as the departure point, the navigation device 1 performs searching for a route from the departure point to the destination by performing calculation of a predetermined algorithm, based upon the path calculation data previously described. The path that is obtained by this route searching is set as the recommended path to the destination. When the recommended path is set in this manner, then, by a method such as using a color that is different from that of the other roads or the like, the recommended path is displayed upon the map as distinguished from the other roads. By doing this, the user is able simply and easily to recognize the recommended path upon the map screen that is being displayed upon the display monitor 16. Moreover, in order for the subject vehicle to be able to be driven along this recommended path, the navigation device 1 guides the subject vehicle by issuing instructions to the user specifying the direction for progression via images or audio or the like. By doing this, route guidance to the destination is performed.

It should be understood that the scale of the map that is being displayed upon the display monitor 16 may be set as desired by the user actuating the input device 18. For example, it may be made possible to set the scale of the map by making the user select, for some reference scale that is set in advance, the length upon the map of this reference scale, in other words its actual distance upon the map. For example, it may be made possible to select any one of 50 m, 100 m, 200 m, 500 m, 1 km, 2 km, or 4 km as the length of the reference scale. The greater is the length of the reference scale at this time, the smaller is the scale of the map. In other words, the scale of the map at the reference scale of 100 m is smaller than at the reference scale of 50 m, and, as the reference scale becomes longer from there through 200 m, 500 m, 1 km, . . . , the smaller does the scale of the map gradually become.

Those maps, among those whose scales are set as explained above, that are on a scale smaller than a predetermined scale are handled as wide area maps. For example, in the case of the example set of map scales described above, those maps for which the length of the reference scale is greater than 1 km, in other words those maps for which the length of the reference scale is 2 km or 4 km, may be taken as being wide area maps whose scale is less than the predetermined scale. Since, with this type of wide area map, the display gaps between roads are comparatively narrow, accordingly, if the congestion information that has been acquired from the VICS information is displayed just as it is upon these maps, the map screen becomes complicated and difficult to understand, and this is undesirable. Thus, the navigation device 1 displays summary maps in which the shapes of the roads have been abbreviated as these wide area maps, and displays the congestion information as superimposed upon these summary maps. By doing this, the congestion information for the various roads is displayed upon the maps in an easily understandable form, even in the case of the wide area maps.

Figure 2:
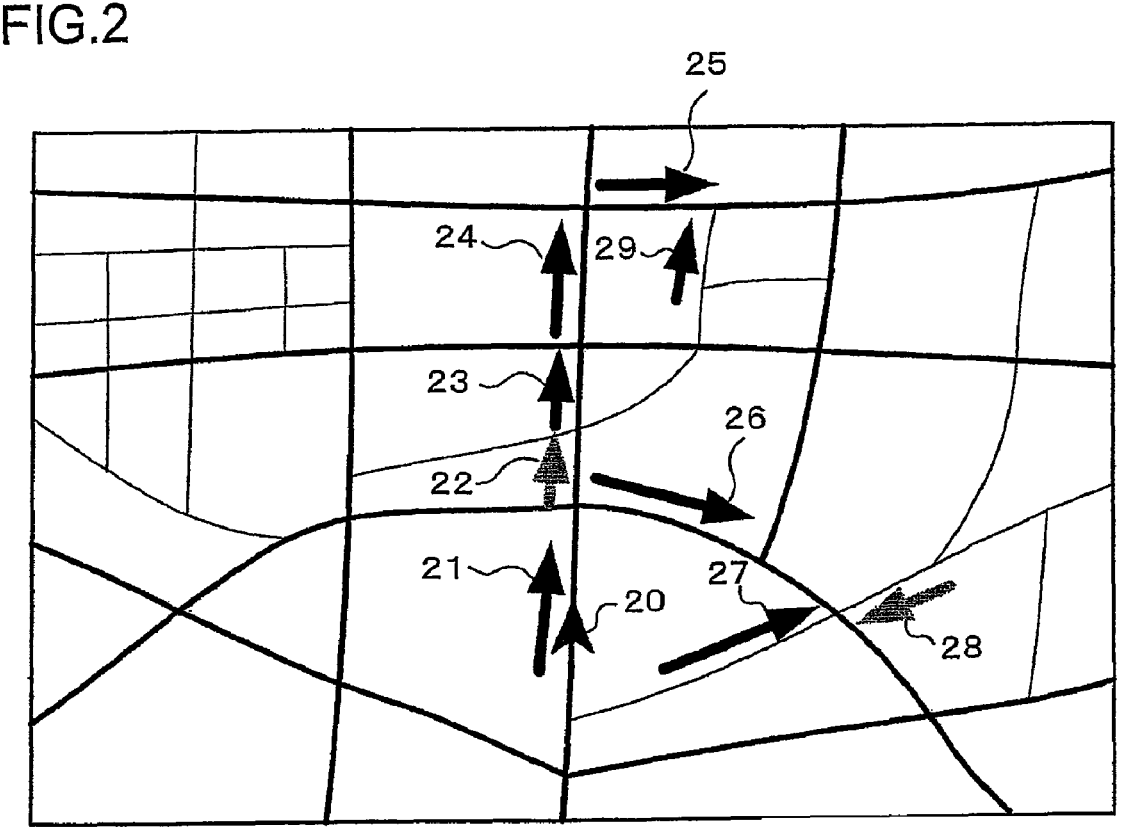
FIG. 2 is a figure showing an example of a map screen in which congestion information is displayed as superimposed over a normal map in which the road shapes are not abbreviated.

A display method for the congestion information upon a wide area map of the sort described above will now be described using the map screens shown in FIGS. 2 and 3 as examples. FIG. 2 shows an example of a map screen in which congestion information is displayed as superimposed over a normal map in which the road shapes are not abbreviated. In this map screen there are displayed a subject vehicle position mark 20 that shows the position of the subject vehicle, and, along certain roads, congestion information marks 21 through 29 that show congestion information for those roads. It should be understood that, among these congestion information marks 21 through 29, the congestion information marks 22 and 28 show that the level of congestion is "crowded". The other congestion information marks show that the level of congestion is "jammed", that is higher than "crowded".

Figure 3:
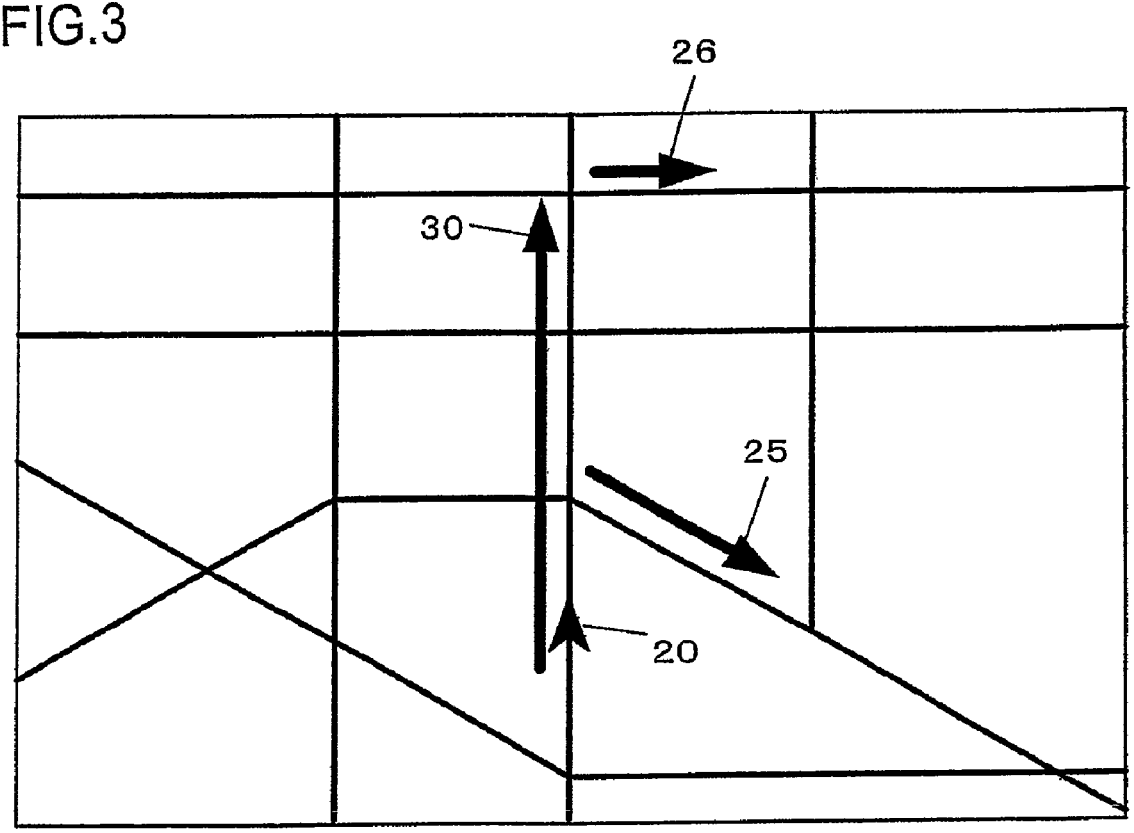
FIG. 3 is a figure showing an example of a map screen in which congestion information is displayed as superimposed over a summary map in which the road shapes are abbreviated.

And FIG. 3 shows, for the same range as that of the map screen of FIG. 2, an example of a map screen in which congestion information is displayed as superimposed over a summary map in which the road shapes are abbreviated. To compare this map screen with the map screen of FIG. 2, the congestion information marks 21 through 24 that are displayed separately in FIG. 2 are displayed in FIG. 3 with a single congestion information mark 30. Moreover, some of the roads that are displayed in FIG. 2 are omitted in FIG. 3. Due to this, the congestion information marks 27, 28, and 29 that are displayed in FIG. 2 are not displayed in FIG. 3. By reducing the number of congestion information marks that are displayed upon the map screen of FIG. 3 in this manner, this map screen becomes easier to view and to understand. It should be understood that, in FIG. 3, the orientations and the lengths of the congestion information marks 25, 26, and 30 are each adjusted to match the shapes of the roads that have been omitted.

Figure 4:
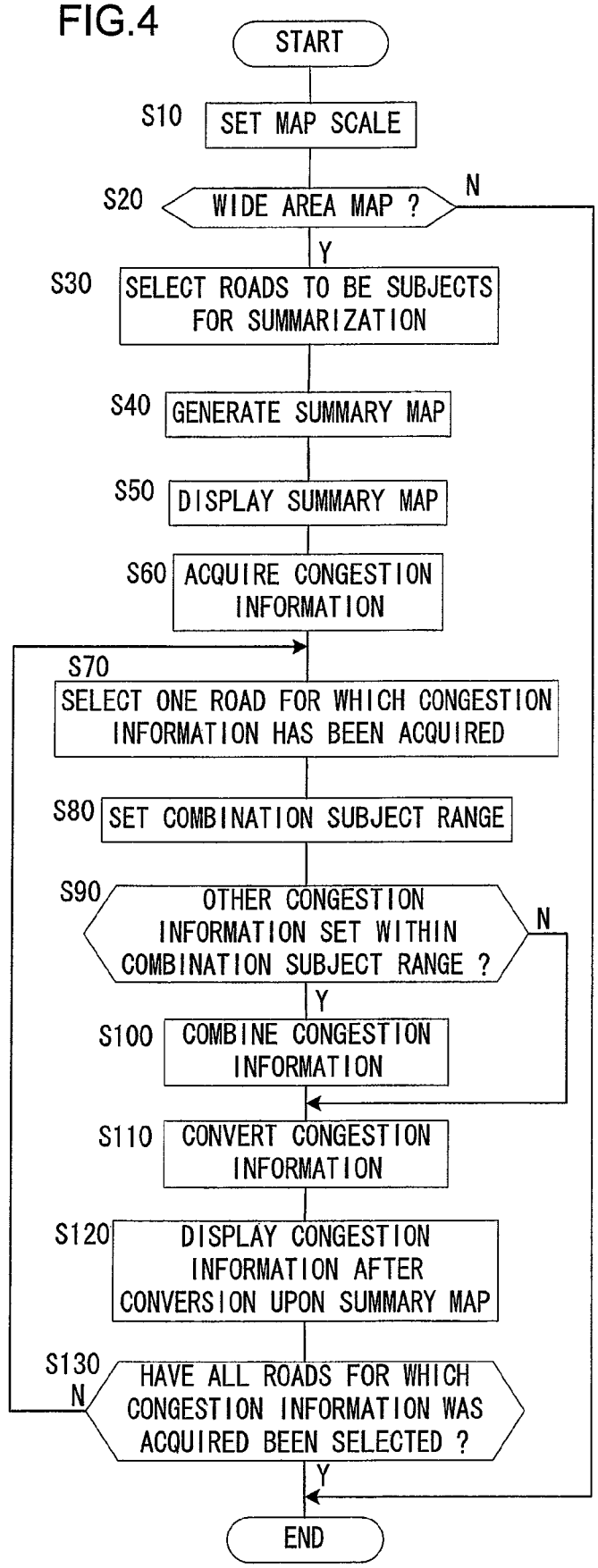
FIG. 4 is a flow chart of processing that is executed when displaying congestion information as superimposed over a summary map.

In FIG. 4, a flow chart is shown for the processing that is executed when displaying the congestion information as superimposed upon the summary map, as in the map screen of FIG. 3 explained above. This flow chart is executed by the control unit 10. In a step S10, the control unit 10 performs setting of the map scale. Here, as previously described, the map scale is set according to actuation by the user.

Next in a step S20 the control unit 10 decides, based upon the map scale that was set in the step S10, whether or not a map at this scale is a wide area map. If the scale is less than the predetermined scale, for example if as previously described a scale is set in which the length of the reference scale is 2 km or 4 km, then the control unit 10 decides that this is a wide area map, and the flow of control proceeds to a step S30. On the other hand, if this is not a wide area map, then the control unit terminates the flow chart of FIG. 4. In this case, as shown in FIG. 2, a map screen is displayed upon the display monitor 16 in which the congestion information is displayed as superimposed upon a normal map in which the shapes of the roads are not abbreviated.

In the step S30, the control unit 10 selects roads to be the subjects of summarization that are to be the subjects for generation of a summary map. Here, according to the map scale that was set in the step S10, the control unit 10 selects, as these roads to be the subjects of summarization, certain ones of those links that are positioned within a predetermined range from the position of the subject vehicle. For example, the control unit 10 may select, among those links that are positioned within the predetermined range from the position of the subject vehicle, as the roads to be the subjects of summarization, only those links that correspond to a specified road classification such as expressways or national highways or provincial highways or the like, while eliminating the links for other road classifications from the roads to be the subjects of summarization.

Next in a step S40, based upon the map data recorded upon the HDD 13, the control unit 10 generates a summary map by abbreviating the shapes of the roads to be the subjects of summarization that were selected in the step S30. In concrete terms it straightens up, according to their lengths, the links that were selected in the step S30 as being the roads to be the subjects of summarization, and moreover quantizes the angles at that these various links intersect by units of a predetermined angle, for example 45°. By doing this, the control unit 10 generates a summary map. It should be understood that it would also be acceptable to utilize some other method for generating the summary map, since the method described above is only one example. In other words, any method for generating the summary map would be acceptable, provided that it is capable of abbreviating the shapes of the roads that are to be the subjects for summarization.

Next in a step S50 the control unit 10 displays the summary map that has been generated in the step S40 upon the display monitor 16. By doing this the summary map, in which the shapes of the roads are abbreviated as shown in the map screen of FIG. 3, is displayed upon the display monitor 16 as a wide area map.

Next in a step S60 the control unit 10 acquires congestion information for the summary map that was displayed in the step S50. Here, the control unit 10 acquires the congestion information for the links that were selected in the step S30 as the roads to be the subjects of summarization, from the VICS information that has been transmitted from the VICS center and has been received by the VICS information reception unit 15. It should be understood that if some link, while being within the range of the summary map, has not been selected in the step S30 as being in the roads to be the subjects of summarization, then this link is eliminated from the subjects for acquisition of congestion information in this step S60.

Next in a step S70 the control unit 10 selects one of the roads for which congestion information was acquired in the step S60. Here, the selection of roads is performed in units of links. In other words, the control unit 10 selects, among the links that have been selected in the step S30 as the roads that are to be the subjects of summarization, one link from those links for which congestion information was acquired in the step S60.

Next in a step S80 the control unit 10 performs setting of a combination subject range for combining the congestion information that has been acquired. Here, the control unit 10 takes the position of the link that was selected in the step S70 as a reference, and sets a range from there that satisfies some predetermined condition as being the combination subject range. For example, in the road that includes the selected link, the control unit 10 may take a range contained between two intersections for which the roads intersecting with that road are both national highways, as being the combination subject range. It should be understood that, if at this time a portion of this range falls outside the range of the summary map, then it is desirable to taken only the portion thereof that falls within the range of the summary map as being the combination subject range.

Next in a step S90 the control unit 10 decides whether or not, within the combination subject range that has been set in the step S80, any congestion information is set other than congestion information for the link that was selected in the step S70. If such other congestion information within the combination subject range is set, in other words if, among the links for which congestion information was acquired in the step S60, some link other than the link that was selected in the step S70 is present within the combination subject range, then the control unit 10 proceeds to a step S100. On the other hand, if no such other congestion information within the combination subject range is set, in other words if, among the links for which congestion information was acquired in the step S60, only the link that was selected in the step S70 is present within the combination subject range, then the control unit 10 jumps over the step S100 and proceeds to a step S110.

Next in the step S100 the control unit 10 combines together the congestion information that was judged in the step S90 to be set within the combination subject range. Here, among the congestion information that has been acquired in the step S60, the control unit 10 combines the items of congestion information that are set for links that are present within the combination subject range all together into a single item of congestion information. By doing this, the control unit 10 combines the congestion information that is set for roads between intersections that are specified in the combination subject range, as congestion information that satisfies a predetermined combination condition.

The way in which the congestion information is combined in the step S100 will now be explained with a concrete example shown in FIGS. 5A and 5B. FIG. 5A shows the situation before the congestion information is combined. In FIG. 5A, the congestion information marks 31, 32, 33, and 34 denote the congestion information that is set for the links L1, L2, L3, and L4 respectively. It should be understood that the congestion information 32 shows that the level of congestion is "crowded". The other congestion information marks show that the level of congestion is "jammed", and this is higher than "crowded".

In FIG. 5A, the road that is contained between the intersection A and the intersection B is made up of the links L1 through L4. It will be supposed that this road intersects with national highways at the intersections A and B. In other words, all of the links L1 through L4 are included within the same combination subject range. It should be understood that the links L1 through L4 show the road shapes that are not abbreviated before generation of the summary map.

FIG. 5B shows the situation after the congestion information has been combined. In FIG. 5B, the congestion information denoted by the congestion information marks 31 through 34 of FIG. 5A is combined together, and is denoted by a single congestion information mark 35. The orientation of this congestion information mark 35 is determined so as to point from the start point of the congestion information mark 31, in other words from the intersection A, to the end point of the congestion information mark 34, in other words the intersection B. Moreover, the length of the congestion information mark 35 is determined by the total of the lengths of the congestion information marks 31 through 34.

The display format of the congestion information mark 35 after combination, in other words the type of congestion that the congestion information mark 35 denotes, is determined based upon the proportions of the total congestion distances for each congestion levels in the congestion information marks 31 through 34 before combination. In other words, the control unit 10 totals up the lengths of the congestion information marks 31 through 34 for each of the levels of congestion, and determines the display format of the congestion information mark 35 after combination in accordance with the largest of these totals. When, in FIG. 5A, the lengths of the congestion information marks 31, 33, and 34 that mean that the level of congestion is "jammed" are totaled, the result becomes longer than the congestion information mark 32 that means that the level of congestion is "crowded". Accordingly, in FIG. 5B, the congestion information mark 35 after combination is displayed in the format that denotes "jammed".

Or, it would also be acceptable to arrange for the control unit 10 to determine the display format for the congestion information mark after combination based upon the total of the link travel times of the links L1 through L4 that are included within the combination subject range. For example, in FIG. 5A, the control unit 10 may obtain the total of the lengths of the links L1 through L4, in other words the distance from the intersection A to the intersection B, and may obtain the average vehicle speed from the intersection A to the intersection B by totaling these link travel times of the links 31 through 34. And the control unit 10 may determine the display format in FIG. 5B for the congestion information mark 35 after combination based upon this average vehicle speed. It should be understood that these link travel times mean the time periods required when the vehicle passes over the various links. The information for these link travel times is included in the VICS information transmitted from the VICS center.

It should be understood that, depending upon the type of the congestion, it would also be acceptable to arrange to change the display format for the congestion information mark 35 after combination partway along. In other words, by setting a portion of the congestion information mark 35 that corresponds to the congestion information mark 32 to a different display format, the control unit 10 may show that the level of congestion of this portion is "crowded". If this is done, it is possible to show the congestion situation for the road more accurately and in more detail with the congestion information mark 35 after combination.

Thus, in this step S100, the control unit performs combination of the congestion information as explained above.

Next in the step S110 the control unit 10 performs conversion of the congestion information that was acquired in the step S60, so as to match the road shape on the summary map that was displayed in the step S50. At this time, if the step S100 was executed and the congestion information was combined, then the control unit 10 converts this congestion information after combination to match the road shape in the summary map. On the other hand, if the step S100 was not executed, then the control unit 10 converts the congestion information that was acquired for the road selected in the step S70 to match the road shape in the summary map.

The way in which the congestion information is converted in the step S110 will now be explained using the concrete example shown in FIG. 6. FIG. 6A shows the situation after combination of the congestion information in the step S100, but before conversion of this congestion information. It should be understood that this FIG. 6A is the same as FIG. 5B described above.

And FIG. 6B shows the situation after conversion of the congestion information. In FIG. 6B, by a method like that previously described, the shape of the road defined by the links L1 through L4 of FIG. 6A is replaced by the link La after summarization. The orientation of the congestion information mark 35 after conversion is determined so as to match the orientation of this link La. Moreover, the length of the congestion information mark 35 after conversion is determined based upon the proportion of the link La to the links L1 through L4. In other words, the control unit 10 determines to what extent to increase or decrease the length of the link La after summarization, with respect to the total of the lengths of the links L1 through L4 before summarization. The length of the congestion information mark 35 after conversion is determined by adjusting the length of the congestion information mark 35 to match this increase or decrease ratio.

In this step S110, as explained above, the control unit 10 performs conversion of the congestion information to match the road shape in the summary map. It should be understood that although, in the above description, an example of a case in which the congestion information was combined has been explained, the same is performed in the case in which the congestion information is not combined as well.

Next in a step S120 the control unit 10 displays the congestion information after conversion, that has been converted in the step S110, upon the summary map that was displayed in the step S50.

And next in a step S130 the control unit 10 decides whether or not all of the roads for which congestion information was acquired in the step S60 have been selected in the step S70. If any road is present, among the roads for which congestion information was acquired, that has not yet been selected, then the control unit 10 repeats processing like that described above, after having returned to the step S70 and selected one of those non-selected roads. On the other hand, if all of the roads for which congestion information was acquired have been selected already, then the control unit terminates the flow chart of FIG. 4.

The control unit 10 executes processing as explained above. By doing this, a summary map like the one shown in FIG. 3 is displayed upon the display monitor 16, with the congestion information marks 25, 26, and 30 representing the congestion information after conversion being displayed along the roads on this summary map.

According to the embodiment explained above, the following advantageous operational effects are obtained.

(1) The control unit 10 sets the map scale (in the step S10). If a map of less than the predetermined scale has been set in this step S10, then the control unit 10 selects the roads to be the subjects of summarization (in the step S30), generates a summary map by abbreviating the shapes of these roads (in the step S40), and displays the summary map that has thus been generated upon the display monitor 16 (in the step S50). Furthermore it acquires congestion information for the roads selected in the step S30 that are to be the subjects of summarization (in the step S60). And it displays (in the step S120) the congestion information that was acquired in the step S60 as superimposed over the summary map that was displayed in the step S50 (in the step S120). Since this is done, accordingly it is possible to display the congestion information upon the map in an easily understood manner, even if the scale of the map is small.

(2) The control unit 10 converts (in the step S110) the congestion information that has been acquired in the step S60 to match the road shapes in the summary map. And, when displaying the congestion information as superimposed upon the summary map in the step S120, the control unit displays the congestion information that has been converted in this manner along the roads in the summary map. Since this is done, accordingly, when the control unit 10 is displaying the congestion information as superimposed upon the summary map, it is possible to show in an easily understandable manner which road in the summary map this congestion information corresponds to.

(3) The control unit 10 combines together (in the step S100) those items of congestion information, among the congestion information that has been acquired in the step S60, that satisfy a predetermined combination condition. And, in the step S120, the control unit 10 displays this congestion information that has been combined in this manner as superimposed upon the summary map. Since this is done, accordingly it is possible to reduce the number of items of display information, and thereby to create a map screen that can be easily seen and easily understood.

(4) After having performed the combination in the step S100 and the conversion in the step S110, in the step S120, the control unit 10 displays the congestion information along the roads in the summary map. Since this is done, accordingly it is possible to display the congestion information succinctly for each road in an easily understandable manner.

(5) In the step S100, the control unit 10 determines the display format of the congestion information after conversion when the congestion information after conversion is displayed in the step S120 based upon the proportions of total congested distances for each congestion levels in the congestion information before combination. Since this is done, accordingly it is possible to determine the display format for the congestion information after conversion in an appropriate manner.

(6) Furthermore, in the step S100, the control unit 10 combines together the congestion information that has been set for a road between specified intersections, for example for a road between intersections with national highways, so as to result in an item of congestion information that satisfies a predetermined combination condition. Since this is done, accordingly it is possible to determine the range over which to combine the congestion information in an appropriate manner.

It should be understood that the way that has been explained in which the shape of the summary map region is obtained in the embodiment described above is only one example. Due to this, it would also be acceptable to arrange to obtain the shape of the summary map region by some other method. For example, it would also be acceptable to arrange to obtain the shape of the summary map region by connecting together the end points of the roads that are to be the subjects of summarization with straight lines, or with curves. Or, it would also be possible to obtain the shape of the summary map region by surrounding the links that have been set for the roads that are to be the subjects of summarization with a region of a predetermined width. Apart from this, it would also be possible to obtain the shape of the summary map region by various other methods.

Although in the embodiment explained above an example of a navigation device that is used by being mounted to a vehicle has been explained, the present invention is not to be considered as being limited to this application. The present invention may be applied to a device of any of various types, provided that it is a map display apparatus for a vehicle that is mounted to a vehicle and that displays a map.

The embodiments and variants thereof explained above are only examples; the present invention is not limited by these details, provided that its distinguishing features are not lost.

What is claimed is:

1. An on-vehicle map display apparatus, comprising:
a map scale setting unit that sets a map scale;
a summary map generation unit that generates a summary map by abbreviating shapes of road links, if a map scale that is less than a predetermined scale is set by the map scale setting unit;
a summary map display control unit that displays the summary map generated by the summary map generation unit upon a display monitor;
a congestion information acquisition unit that acquires a plurality of congestion information for each of the road links;
a combination unit that combines together a plurality of congestion information that satisfies a predetermined combination condition among the congestion information that has been acquired for each of the road links by the congestion information acquisition unit, the plurality of congestion information including congestion information for a first road link and a second road link, the first and second road links being separated from each other by an intervening road link whose congestion information is not combined in the plurality of congestion information; and
a congestion information display control unit that displays the congestion information that has been acquired by the congestion information acquisition unit and combined by the combination unit as superimposed upon the summary map displayed upon the display monitor by the summary map display control unit.

2. An on-vehicle map display apparatus according to claim 1, further comprising a conversion unit that converts the congestion information that has been acquired by the congestion information acquisition unit to match the road shape in the summary map, and wherein:

the congestion information display control unit displays the congestion information that has been converted by the conversion unit along the road upon the summary map when displaying the congestion information as superimposed upon the summary map.

3. An on-vehicle map display apparatus according to claim 1, further comprising:
a conversion unit that converts the congestion information that has been combined by the combination unit to match the abbreviated shapes of the road links in the summary map, and wherein:
the congestion information display control unit displays the congestion information that has been converted by the conversion unit along the road links upon the summary map when displaying the congestion information as superimposed upon the summary map.

4. An on-vehicle map display apparatus according to claim 3, wherein:
the congestion information indicates congestion levels and congested distances for each of the road links; and
the combination unit determines the display format of the congestion information after conversion that is to be displayed by the congestion information display control unit based upon proportions of total congested distances for each congestion level in the congestion information before combination.

5. An on-vehicle map display apparatus according to claim 4, wherein the combination unit combines together congestion information that has been set for each of a plurality of road links between specified intersections, as being congestion information that satisfies the predetermined combination condition.

6. An on-vehicle map display apparatus according to claim 3, wherein the combination unit combines together congestion information that has been set for each of a plurality of road links between specified intersections, as being congestion information that satisfies the predetermined combination condition.

7. An on-vehicle map display apparatus according to claim 1, wherein:
the congestion information indicates congestion levels and congested distances for each of the road links; and
the combination unit determines the display format of the congestion information after conversion that is to be displayed by the congestion information display control unit based upon proportions of total congested distances for each congestion level in the congestion information before combination.

8. An on-vehicle map display apparatus according to claim 7, wherein the combination unit combines together congestion information that has been set for each of a plurality of road links between specified intersections, as being congestion information that satisfies the predetermined combination condition.

9. An on-vehicle map display apparatus according to claim 1, wherein the combination unit combines together congestion information that has been set for each of a plurality of road links between specified intersections, as being congestion information that satisfies the predetermined combination condition.

10. A map display method, comprising:
a step of an on-vehicle map display apparatus setting a map scale;
a step of the on-vehicle map display apparatus generating a summary map by abbreviating shapes of road links, if a map scale that is less than a predetermined scale is set;
a step of the on-vehicle map display apparatus displaying the generated summary map upon a display monitor;
a step of the on-vehicle map display apparatus acquiring a plurality of congestion information for each of the road links;
a step of the on-vehicle map display apparatus combining together a plurality of congestion information that satisfies a predetermined combination condition among the congestion information that has been acquired for each of the road links, the plurality of congestion information including congestion information for a first road link and a second road link, the first and second road links being separated from each other by an intervening road link whose congestion information is not combined in the plurality of congestion information; and
a step of the on-vehicle map display apparatus displaying the acquired and combined congestion information as superimposed upon the summary map displayed upon the display monitor.

* * * * *